US009970071B2

(12) United States Patent
Motamedhashemi

(10) Patent No.: US 9,970,071 B2
(45) Date of Patent: May 15, 2018

(54) METHOD FOR REDUCING IRON OXIDE TO METALLIC IRON USING COKE OVEN GAS

(71) Applicant: Mirmohammadyousef Motamedhashemi, Charlotte, NC (US)

(72) Inventor: Mirmohammadyousef Motamedhashemi, Charlotte, NC (US)

(73) Assignee: MIDREX TECHNOLOGIES, INC., Charlotte, NC (US)

( * ) Notice: Subject to any disclaimer, the term of this patent is extended or adjusted under 35 U.S.C. 154(b) by 234 days.

(21) Appl. No.: 14/853,399

(22) Filed: Sep. 14, 2015

(65) Prior Publication Data
US 2016/0083811 A1   Mar. 24, 2016

Related U.S. Application Data

(60) Provisional application No. 62/053,864, filed on Sep. 23, 2014.

(51) Int. Cl.
*C21B 13/00* (2006.01)
*C21B 13/02* (2006.01)
*C01B 3/50* (2006.01)

(52) U.S. Cl.
CPC .......... *C21B 13/0073* (2013.01); *C01B 3/508* (2013.01); *C21B 13/02* (2013.01);
(Continued)

(58) Field of Classification Search
CPC ............................. C21B 13/0073; C21B 13/02
See application file for complete search history.

(56) References Cited

U.S. PATENT DOCUMENTS 3,163,153 A * 12/1964 Griffin .................. F22B 1/1861
  122/356
4,351,513 A *  9/1982 Sanzenbacher ..... C21B 13/0073
  266/156
(Continued)

FOREIGN PATENT DOCUMENTS

GB           304174 A  *  1/1929    ............. C21B 13/00
JP       61-113689 A  *  5/1986
WO       2013093640 A2     6/2013

OTHER PUBLICATIONS

Espacenet Family List for US 2014083252 A1 published Mar. 27, 2014.*

(Continued)

*Primary Examiner* — George Wyszomierski
*Assistant Examiner* — Tima M McGuthry Banks
(74) *Attorney, Agent, or Firm* — Clements Bernard Walker PLLC; Christopher L. Bernard

(57) ABSTRACT

The present invention provides a method for reducing iron oxide to metallic iron using coke oven gas, including: dividing coke oven gas from a coke oven gas source into a plurality of coke oven gas streams; providing a first coke oven gas stream to a hydrogen enrichment unit to form a hydrogen-rich product stream that is delivered to a reduction shaft furnace as part of a reducing gas stream; and providing a tail gas stream from the hydrogen enrichment unit to a reforming reactor to form a reformed gas stream that is delivered to a reduction shaft furnace as part of the reducing gas stream. Optionally, a spent top gas stream from the reduction shaft furnace is cleansed of $CO_2$ and recycled back to the reducing gas stream.

18 Claims, 2 Drawing Sheets

(52) U.S. Cl.
CPC .. *C01B 2203/025* (2013.01); *C01B 2203/148* (2013.01); *Y02P 10/122* (2015.11); *Y02P 10/128* (2015.11); *Y02P 10/132* (2015.11); *Y02P 10/136* (2015.11); *Y02P 20/129* (2015.11); *Y02P 20/13* (2015.11)

(56) References Cited

U.S. PATENT DOCUMENTS

| | | |
|---|---|---|
| 4,470,581 A | 9/1984 | Ahrendt et al. |
| 2004/0226406 A1 | 11/2004 | Duarte-Escareno et al. |
| 2012/0125159 A1 | 5/2012 | Metius et al. |
| 2013/0305883 A1* | 11/2013 | Martinis ............. C21B 13/0073 75/415 |
| 2014/0083252 A1* | 3/2014 | Boehm .................... C21B 5/06 75/414 |

OTHER PUBLICATIONS

Ametek, "Process Heaters, Furnaces and Fired Heaters" 2014 [online] [retrieved on Nov. 11, 2015] http://www.ametekpi.com/download/process-heaters-furnaces-and-fired heaters.pdf.

Jul. 1, 2016 International Search Report issued in International Patent Application No. PCT/US2015/50107.

* cited by examiner

METHOD FOR REDUCING IRON OXIDE TO METALLIC IRON USING COKE OVEN GAS

CROSS-REFERENCE TO RELATED APPLICATION

The present patent application/patent claims the benefit of priority of U.S. Provisional Patent Application No. 62/053,864, filed on Sep. 23, 2014, and entitled "METHOD FOR REDUCING IRON OXIDE TO METALLIC IRON USING COKE OVEN GAS," the contents of which are incorporated in full by reference herein.

FIELD OF THE INVENTION

The present invention relates generally to a method for reducing iron oxide to metallic iron. More specifically, the present invention relates to a method for reducing iron oxide to metallic iron using coke oven gas (COG).

BACKGROUND OF THE INVENTION

For the direct reduction (DR) of iron oxide to sponge iron, the reducing agents $H_2$ and CO, or any combination of them, can be used. Normally, a hydrocarbon source, such as natural gas, is utilized to produce these reducing agents via a catalytic or non-catalytic reforming process. The most practiced reforming processes are catalytic steam/$CO_2$ reforming in a tubular reformer with an external heat supply, autothermal reforming (ATR) in a packed catalyst bed with internal heat supplied by the partial combustion of the hydrocarbon(s) with oxygen, and a non-catalytic partial oxidation (PDX) reforming process whereby the hydrocarbon source is partially oxidized and reformed to a mixture of $H_2$ and CO, while internally providing the required heat for the reactions.

Besides natural gas, another widespread source of hydrocarbons in the iron and steel industry is COG, which typically contains 20-28% methane. Due to its considerable $CH_4$ content, COG can be reformed into $H_2$ and CO to produce reducing gas to reduce iron oxide to metallic iron, in the form of direct reduced iron (DRI), hot direct reduced iron (HDRI), or hot briquetted iron (HBI) in a DR plant. A typical COG stream coming from a COG treatment plant contains between 50.0-65.0% $H_2$, 4.0-8.0% CO, up to 2.0% benzene-toluene-xylene (BTX), and up to 5.0% higher hydrocarbons, such as ethane, propane, and ethylene. The data available for different plants in China, Japan, and Germany indicate that the minimum concentration of $H_2$ in a typical COG stream is 52.0%. The presence of such high concentrations of $H_2$ in COG has adverse consequences for both catalytic and non-catalytic reforming processes, since it is the main product of reforming reactions; and, therefore, reduces the efficiency of the reforming reactions. In other words, since the rate of reforming reactions is slower in the presence of high concentrations of hydrogen, more energy is consumed to reform the hydrocarbons to $H_2$ and CO.

More specifically, for ATR and PDX processes, the presence of high amounts of $H_2$ has another undesired outcome, i.e. this useful reducing agent is combusted to form $H_2O$, an oxidizing agent. In other words, while the hydrocarbon source is being reformed by oxygen to produce $H_2$ (and CO), the already present $H_2$ consumes loads of available oxygen to produce $H_2O$, which translates into wasting material and energy resources.

Thus, the present invention provides an economic DR process in which the majority of the $H_2$ and CO is recovered from the COG before sending it to the PDX unit. Therefore, the overall efficiency of the plant improves considerably in terms of material and energy consumption, and capital and operating investments (i.e. CAPEX and OPEX).

BRIEF SUMMARY OF THE INVENTION

The present invention makes use of an industrially well-practiced technology, i.e. a pressure swing adsorption (PSA) unit, by which the majority of the reducing agents ($H_2$ and CO) are recovered from the COG through adsorption of other components on proper adsorbents. The PSA unit delivers two streams: (1) a product stream that is rich in reducing agents, but can also contain some $CH_4$ and other components, and (2) a tail gas stream that is rich in $CH_4$ and all other hydrocarbons present in the COG. The latter stream flows to the reforming unit, more specifically to a PDX reactor, for producing more reducing agents, $H_2$ and CO. The PSA product stream then blends with the reducing gas generated in the reforming step, before injection into the DR shaft furnace.

The present invention makes use of the available heat in the product gas coming off the PDX reactor, typically with a temperature of >1200 degrees C., to increase the temperature of the hydrogen-rich stream recovered in the PSA unit to the proper level required for reduction reactions, typically between 900 degrees C. and 1000 degrees C.

Thus, the present invention provides a simple way to increase the carbon content of DR iron by injecting the hydrocarbon-rich stream (i.e. tail gas) coming off the PSA unit into the reduction reactor, when COG is the only available hydrocarbon source to the DR plant.

Thousands of PSA units have been installed all around the world by different vendors in oil refineries, petrochemical plants, and other chemical industries where the separation of $H_2$ or $CO_2$ from the process streams is vital for efficient operation of the plant. There are other industrially practiced methods for $H_2$ or $CO_2$ removal from gas mixtures as well, such as cryogenic separation, organic and inorganic membrane modules, vacuum pressure swing adsorption (VPSA), and temperature swing adsorption (TSA) offered by different vendors that can be used in conjunction with the present invention instead of a PSA, if they can meet the process requirements for COG applications.

In various exemplary embodiments, the present invention provides a method for reducing iron oxide to metallic iron using coke oven gas, including: dividing coke oven gas from a coke oven gas source into a plurality of coke oven gas streams; providing a first coke oven gas stream to a hydrogen enrichment unit to form a hydrogen-rich product stream that is delivered to a reduction shaft furnace as part of a reducing gas stream; and providing a tail gas stream from the hydrogen enrichment unit to a reforming reactor to form a reformed gas stream that is delivered to a reduction shaft furnace as part of the reducing gas stream. The hydrogen enrichment unit includes one of a pressure swing adsorption unit, a vacuum pressure swing adsorption unit, a temperature swing adsorption unit, a cryogenic separator, and an organic or inorganic membrane module. The reforming reactor includes a partial oxidation reactor. The method also includes compressing the coke oven gas. The method further includes compressing and heating the tail gas stream. The method still further includes removing condensates and heavy hydrocarbons from the coke oven gas by passing the coke oven gas through a separation unit e.g. packed beds of charcoal or a coalescing knockout drum. The method still further includes providing a second coke oven gas stream to the reforming reactor to fire a burner of the reforming reactor. The method still further includes compressing the second coke oven gas stream. The method still further includes providing a third coke oven gas stream to the reduction shaft furnace as part of the reducing gas stream. The method still further includes heating the third coke oven gas stream. Optionally, the method still further includes providing a fourth coke oven gas stream to a transition zone of the reduction shaft furnace. The method still further includes heating the fourth coke oven gas stream. Optionally, the method still further includes providing a fifth coke oven gas stream to a cooling zone of the reduction shaft furnace. Optionally, the method still further includes recycling a spent top gas stream from the reduction shaft furnace back to the reducing gas stream. The method still further includes using the spent top gas stream to generate steam in a waste heat recovery steam generator. The method still further includes scrubbing and cooling the spent top gas stream in a scrubber/cooler. The method still further includes removing $CO_2$ from the spent top gas stream using a $CO_2$ removal unit. The method still further includes heating the spent top gas stream in a radiant heater.

BRIEF DESCRIPTION OF THE DRAWINGS

The present invention is illustrated and described herein with reference to the various drawings, in which like reference numbers are used to denote like method steps, as appropriate, and in which.

DETAILED DESCRIPTION OF THE INVENTION

Figure 1:
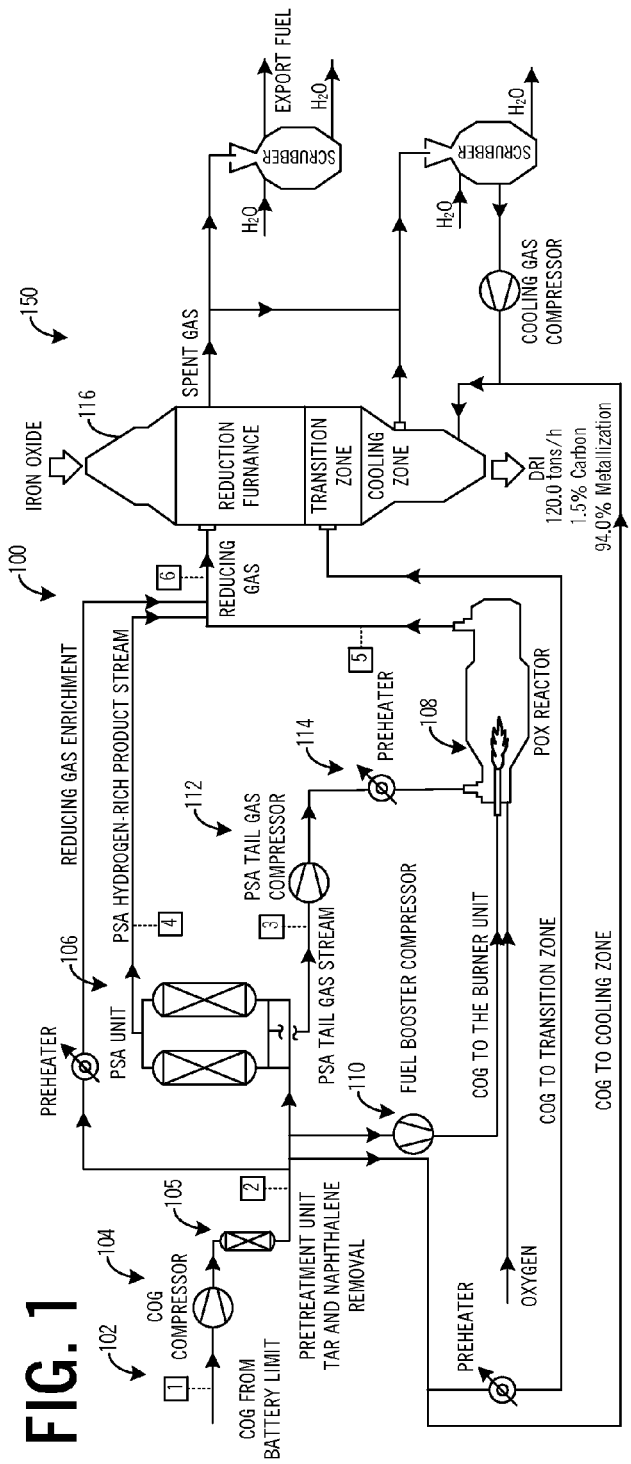
FIG. 1 is a process flowsheet illustrating one exemplary embodiment of the method for reducing iron oxide to metallic iron using COG of the present invention, highlighting a once-through configuration.

The object of the present invention is to develop an efficient and cost effective process by which commercially available COG streams can be used in a DR plant to produce metallic iron. The present invention provides a method to effectively use the $H_2$ and CO content of a COG stream, where it partially bypasses the reforming step, specifically the PDX step, and, therefore, can be directly used as a reducing agent, instead of being combusted or circulated within the reforming step.

For a PDX-based DR plant that uses COG as the main source for the feed and fuel, the following advantages can be outlined for a PSA unit that separates reducing gases from COG:

1. The oxygen consumption of the plant (i.e. OPEX) decreases tangibly owing to the fact that in the proposed design more than ca. 50% of the combustible gases (i.e. $H_2$ and CO) bypass the PDX reactor. In other words, theoretically, the oxygen consumption of the plant can decrease by ca. 50×0.5=25.0% (based on only the feed gas flow and composition—each mole of $H_2$ or CO needs half a mole of oxygen to combust).
2. Since the fuel consumption of a PDX reactor is typically proportional to oxygen consumption, it is expected that the required fuel flow for the PDX reactor (OPEX) also decreases.
3. In the case of using COG as the fuel in the PDX reactor burners, the above-mentioned saving in fuel consumption can be used to boost the plant production.
4. The above noticeable drop in the feed and fuel/oxygen flow rates to the PDX reactor (i.e. total throughput) cut the number and/or size of the required PDX reactor(s) and other related unit operations for a given job (i.e. CAPEX). If the PDX reactor is designed based on the total throughput, the number of required reactors will be at least half of the necessary units as compared to when no PSA unit is utilized. However, if the size of the PDX reactor is limited to the capacity of the combustion unit for each specific fuel, theoretically a minimum reduction of ca. 25.0% in the number of PDX reactors is predictable (i.e. CAPEX).
5. High-pressure PSA product gas can be used as the fuel in the PDX, and, thus, there is no need for any further compressor equipment.
6. Since only ca. 50.0% of the COG flows into the PDX reactors, in the case of a short-time reactor failure, the PSA unit can still supply enough reducing gas to the plant. In addition, this feature removes the necessity for standby PDX reactors for the plant.
7. The product stream rich in the reducing agents $H_2$ and CO coming off the PSA towers at ambient temperature can be directly used to cool down the PDX generated gas from >1200° C. to ~1100° C., offering the best energy efficiency possible for the plant (i.e. OPEX). In other words, the extra energy available in the PDX generated gas can be directly used to heat-up the cold hydrogen-rich gas, and, therefore, there is no need to do any kind of quenching and reheating unit operations (i.e. CAPEX).
8. Since only about 50.0% of the original COG is processed by the PDX reactor, the size of the COG feed compressor (i.e. CAPEX), and its energy consumption (i.e. OPEX), are noticeably less than the processes with no PSA unit.
9. Since only about 50.0% of the original COG is processed by the PDX reactor, the size of the COG feed heater (i.e. CAPEX), and its energy consumption (i.e. OPEX) are drastically less than the processes with no PSA unit.
10. Since all the sulfur compounds present in the COG are collected in the tail gas stream coming off the PSA unit, only 50.0% of the original COG is processed by the desulphurization unit; and, therefore, the size of the desulphurization unit (i.e. CAPEX) is significantly less than the processes with no PSA unit.
11. The resulting reducing gas (i.e. reformed PSA tail gas+PSA product stream+enrichment COG) is ready to use directly in the shaft furnace, with a quality of ~10 (defined as $[CO+H_2]/[CO_2+H_2O]$) and a temperature of 970-1000 degrees C. Therefore, the whole process can be designed as a very efficient once-through process where the spent gas off the reduction furnace is not treated for further application in the DR facility.
12. In the case of a once-through flowsheet, there is no need to have supplemental unit operations, like waste heat boilers, heat exchangers, heaters, etc., which, in turn, results in considerable savings in capital cost (i.e. CAPEX). The lesser number of unit operations also makes running and controlling the process much easier, with less maintenance cost (i.e. OPEX).
13. Since the bustle gas has high enough temperature with a satisfactory quality, there is no need to use too much oxygen to boost the bustle gas temperature (i.e. OPEX).

14. The amount of oxygen required for the partial combustion of COG is set based on only the hydrocarbon content of the COG, and not based on other combustibles, like $H_2$ and CO. At the same time, the lower number of these combustibles in the reacting mixture results in more accessibility of the hydrocarbons to oxygen; and, therefore, the better and more uniform distribution of oxygen among hydrocarbons is predictable. This, in turn, diminishes the amount of soot and water vapor produced by side reactions during the partial combustion of the COG.
15. The hydrocarbon-rich tail gas off of the PSA towers can be used instead of COG to increase the carbon content of the DRI in the transition and cooling zones.
16. The $H_2$-rich product gas off of the PSA unit can be used as the fuel in the PDX burners, producing more hot steam in the flame, which reduces the likelihood of soot formation within the reactor. This, in turn, can cut the amount of excess oxygen required to diminish soot formation inside the PDX reactor (i.e. OPEX).
17. Since the reduction furnace can handle CO, as well as $H_2$, it is not necessary to utilize conventional high-pressure PSA units with high purity $H_2$ as the desired product in oil refineries or ammonia plants. In fact, the operation of a low-pressure PSA unit not only lowers the energy consumption required for the initial compression of COG (i.e. OPEX), but also preserves a notable amount of CO in the product stream coming off of the PSA unit.

Figure 2:
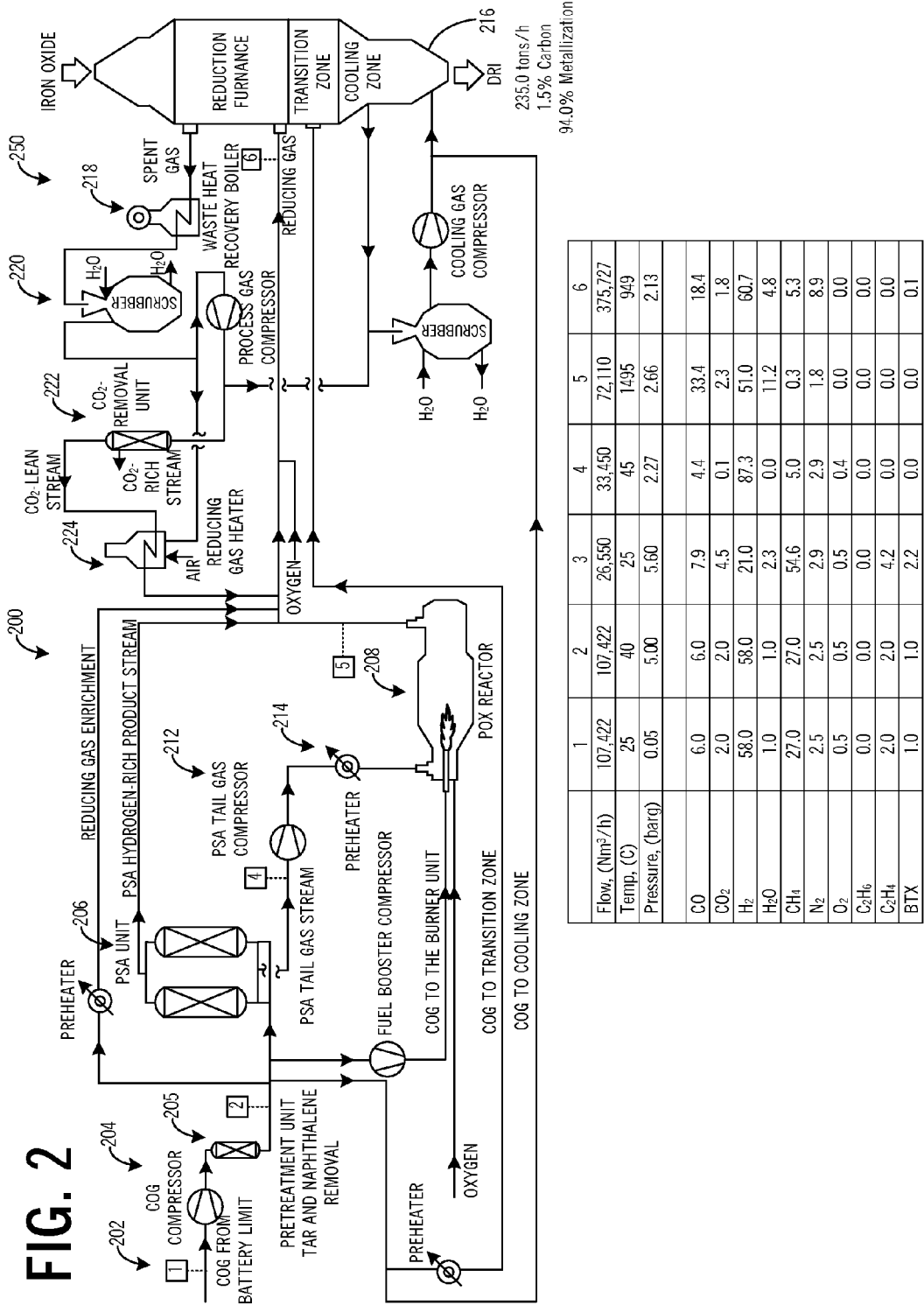
FIG. 2 is a process flowsheet illustrating another exemplary embodiment of the method for reducing iron oxide to metallic iron using COG of the present invention, highlighting a recycle configuration.

Referring now to FIGS. 1 and 2, in various exemplary embodiments, the method 100, 200 of the present invention starts with the compression of the COG from a COG source 102, 202 to ~5.0-7.0 barg in a compressor 104, 204. This pressure can change based on the requirements set by the vendor of the PSA unit 106, 206 or the desired recovery rate of the hydrogen as set by the project. The compressed gas passes through a coalescing knockout drum 105, 205 in order to avoid the entry of liquids into the PSA unit 106, 206. The coalescer section in the knockout drum 105, 205 is important, due to the fact that heavier hydrocarbons, like BTX, naphthalene, and tar, occur as aerosols (i.e. very small droplets) that pass normal knockout drums. Alternative methods, such as TSA units, packed beds of charcoal or activated carbon, or cold traps, can also be used, instead of the coalescing knockout drum 105, 205, as PSA guard units.

The compressed COG is then distributed in the DR plant 150, 250 for different applications, i.e. feed for the reformer reactor 108, 208, fuel for the reformer reactor 108, 208, enriching the reducing gas, and a transition zone stream to increase the carbon content of the product DRI. The enrichment and transition zone streams can also be taken off before the coalescing knockout drum 105, 205. For a PDX-based plant 150, 250, depending on the design of the PDX reactor 108, 208, it may be required to increase the pressure of the fuel stream for the PDX burner using a booster compressor 110, 210.

The main portion of the gas flows to the PSA unit 106, 206, where the majority of its hydrogen content (typically more than 70.0%) separates from the COG. In addition, for a conventional $H_2$-PSA system, ~30.0-40.0% of the CO and up to ~15.0% of the $CH_4$ come with the $H_2$ to this product stream. Since PSA units typically deliver a dry gas in the product stream, the quality of the hydrogen-rich gas, defined as $(H_2+CO)/(H_2O+CO_2)$, is very high, but at a low temperature.

The tail gas coming off the PSA towers, now rich in methane and other heavy hydrocarbons, does not have enough temperature and pressure and, thus, it is compressed in a compressor 112, 212 and preheated in a preheater 114, 214 to a proper temperature and pressure before flowing to the reforming section 108, 208, where it is partially combusted and reformed by oxygen into a syngas stream rich in $H_2$ and CO.

If it is required by process, the tail gas coming off the PSA towers flows into a series of treatment units (not illustrated) for sulfur removal and heavy hydrocarbon conversion. The latter step, converts or removes cyclic and olefin hydrocarbons into more saturated ones to protect the downstream equipment from coking.

Although the quality of the syngas generated within the PDX reactor 108, 208 is not typically outstanding, it comes off the PDX reactor 108, 208 at an elevated temperature of more than about 1200 degrees C. Therefore, as an option, it can be blended with the PSA product stream and/or preheated enrichment COG to form a high quality gas with a moderate temperature of ca. 1000 degrees C. The resulting bustle gas flows into the shaft furnace 116, 216 for reducing iron oxides.

In order to increase the carbon content of the DRI, transition zone COG, which can also be taken off after the PSA unit 106, 206 from the tail gas stream, is preheated and flows in to the transition zone of the shaft furnace 116, 216.

Referring now specifically to FIG. 2, in one exemplary embodiment, the spent gas coming off the reduction furnace 216 has a high enough energy content to be recovered in a waste heat recovery steam generator (HRSG) 218. The generated steam can be used inside the plant 250 for different applications, like $CO_2$ stripping, or it can be exported to neighboring facilities, if demanded.

The gas leaving the HRSG unit 218 then flows into a cleaning and cooling unit 220, preferably a venturi scrubber equipped with packed bed coolers, where the majority of its water content is removed through direct contact with cooling water. Direct contact with cooling water also removes most of the solid particulates (i.e. fines and gangues) carried by the spent gas.

The clean gas stream coming off the scrubbing unit afterwards runs into a conventional $CO_2$ removal unit 222, i.e. a pressure/temperature swing adsorption, physical or chemical absorption, or membrane module, where the majority of its $CO_2$ content is captured to reduce the oxidant level of the gas. The gas, now rich in $H_2$ and CO, passes through a radiant heater 224 to reach the very high temperatures, e.g. about 950 degrees C., necessary for reduction reactions within the reduction shaft furnace 216. The hot gas leaving the radiant heater 224 then blends with the syngas generated in the reformer reactor 208 before entering the reduction shaft furnace 216.

The two schematics of FIGS. 1 and 2 include typical mass balance numbers. The once-through case (FIG. 1) is suggested for the production of 123.0 tons/h of high quality DRI from COG using a PDX reactor, for example. The recycle case (FIG. 2) is suggested for the production of 235.0 tons/h of high quality DRI from COG using a PDX reactor, for example. For the recycle-based design (FIG. 2), the spent gas coming off the reduction furnace 216 passes through a series of treatment units before being reutilized in the process for boosting the production rate of the plant 250. Both flowsheets are supported by the corresponding mass balance figures.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims.

What is claimed is:

1. A method for reducing iron oxide to metallic iron using coke oven gas, comprising:
dividing coke oven gas from a coke oven gas source into a plurality of coke oven gas streams;
providing a first coke oven gas stream to a hydrogen enrichment unit to form a hydrogen-rich product stream that is delivered to a reduction shaft furnace as part of a reducing gas stream; and
providing a tail gas stream from the hydrogen enrichment unit to a reforming reactor to form a reformed gas stream that is delivered to a reduction shaft furnace as part of the reducing gas stream;
wherein the reformed gas stream has a temperature of greater than 1200 degrees C. and heats the reducing gas stream to a temperature of between 900 degrees C. and 1000 degrees C. without prior heating of the hydrogen-rich product stream.

2. The method of claim 1, wherein the hydrogen enrichment unit comprises one of a pressure swing adsorption unit, a vacuum pressure swing adsorption unit, a temperature swing adsorption unit, a cryogenic separator, and an organic or inorganic membrane module.

3. The method of claim 1, wherein the reforming reactor comprises a partial oxidation reactor.

4. The method of claim 1, further comprising compressing the coke oven gas.

5. The method of claim 1, further comprising compressing and heating the tail gas stream.

6. The method of claim 1, further comprising removing condensates from the coke oven gas by passing the coke oven gas through a separation unit.

7. The method of claim 1, further comprising providing a second coke oven gas stream to the reforming reactor to fire a burner of the reforming reactor.

8. The method of claim 7, further comprising compressing the second coke oven gas stream.

9. The method of claim 1, further comprising providing a third coke oven gas stream to the reduction shaft furnace as part of the reducing gas stream.

10. The method of claim 9, further comprising heating the third coke oven gas stream.

11. The method of claim 1, further comprising providing a fourth coke oven gas stream to a transition zone of the reduction shaft furnace.

12. The method of claim 11, further comprising heating the fourth coke oven gas stream.

13. The method of claim 1, further comprising providing a fifth coke oven gas stream to a cooling zone of the reduction shaft furnace.

14. The method of claim 1, further comprising recycling a spent top gas stream from the reduction shaft furnace back to the reducing gas stream.

15. The method of claim 14, further comprising using the spent top gas stream to generate steam in a waste heat recovery steam generator.

16. The method of claim 14, further comprising scrubbing and cooling the spent top gas stream in a scrubber/cooler.

17. The method of claim 14, further comprising removing $CO_2$ from the spent top gas stream using a $CO_2$ removal unit.

18. The method of claim 14, further comprising heating the spent top gas stream in a radiant heater.

* * * * *